[11] 3,625,593

[72] Inventor George W. ... , Princeton, N.J.
[21] Appl. No. 795,874
[22] Filed Feb. 3, 1969
[45] Patented Dec. 7, 1971
[73] Assignee RCA Corporation

[54] ELECTRICAL CONTROL OF LIGHT POLARIZATION UTILIZING THE OPTICAL PROPERTY OF FLUIDS
8 Claims, 10 Drawing Figs.

[52] U.S. Cl. .................................. 350/157, 350/3.5, 350/147, 350/150, 356/114
[51] Int. Cl. .................................. G02b 27/28
[50] Field of Search .................................. 350/147, 150, 157, 159; 356/114–116

[56] References Cited
UNITED STATES PATENTS

| | | | |
|---|---|---|---|
| 3,001,439 | 9/1961 | Rouy | 356/116 |
| 3,302,028 | 1/1967 | Sterzer | 350/150 X |
| 3,411,342 | 11/1968 | Liermann | 356/116 X |
| 3,481,671 | 12/1969 | West et al. | 356/116 X |
| FOREIGN PATENTS | | | |
| 825,568 | 3/1937 | France | 350/116 |

Primary Examiner—David Schonberg
Assistant Examiner—Paul R. Miller
Attorney—H. Christoffersen ABSTRACT: The electrical control of light polarization utilizing the optical properties of fluids. A container of fluid is placed in the path of a polarized light beam, and the polarization of the light is changed an amount dependent upon the effective dimensions of the container and the optical characteristics of the fluid. Means responsive to the change in polarization are included for either deflecting, or varying the intensity of, the polarized light.

INVENTOR
GEORGE W. TAYLOR

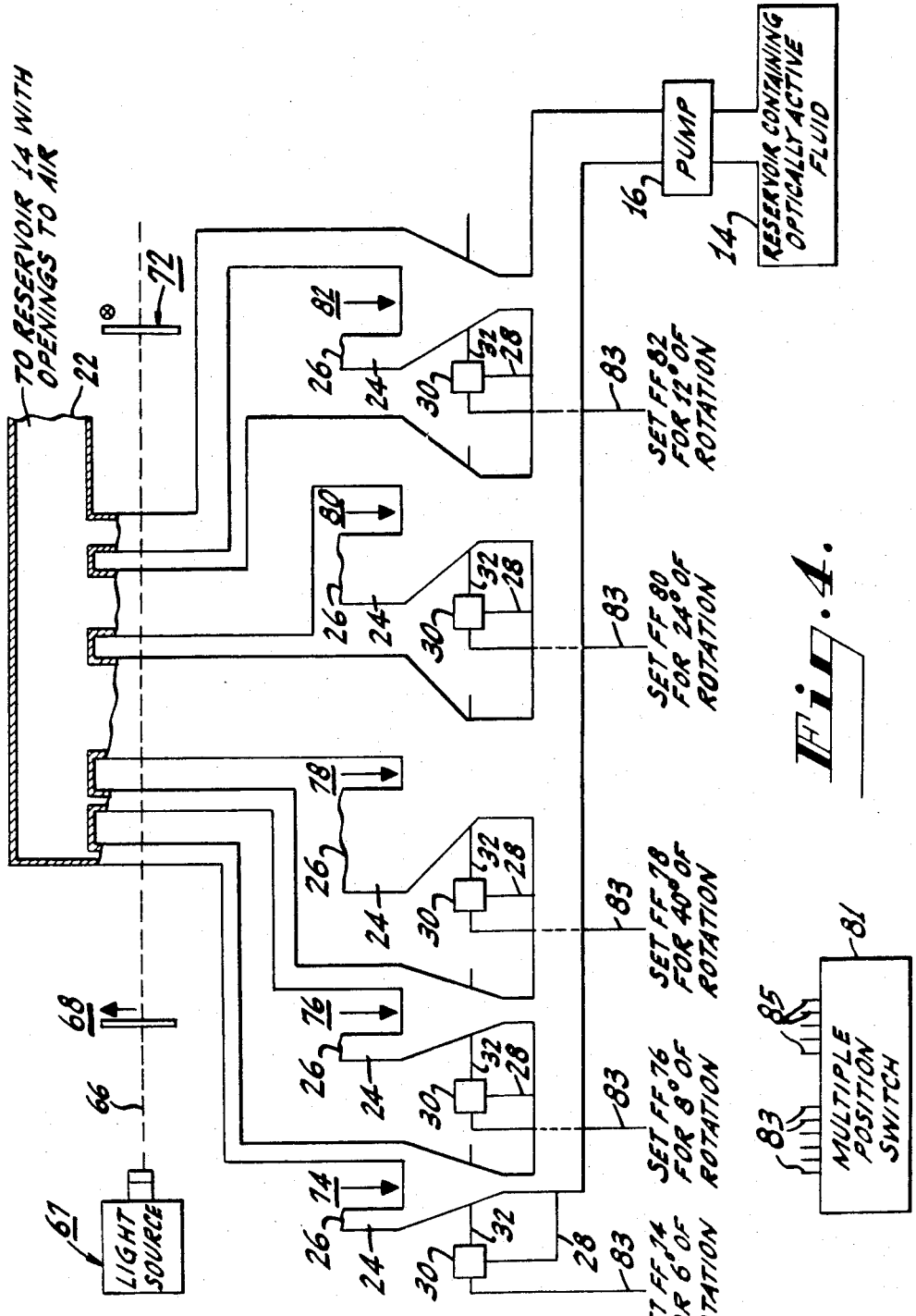

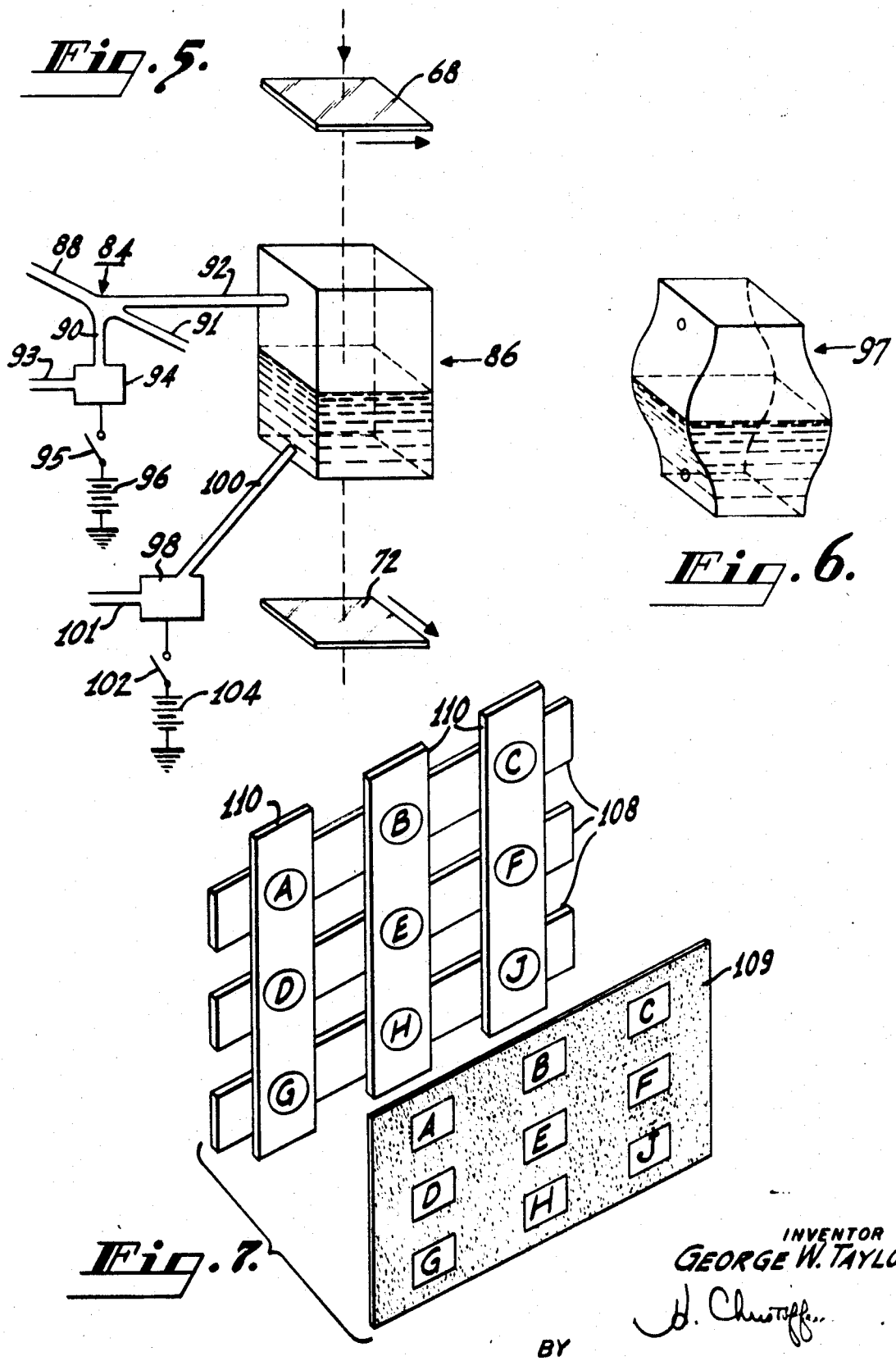

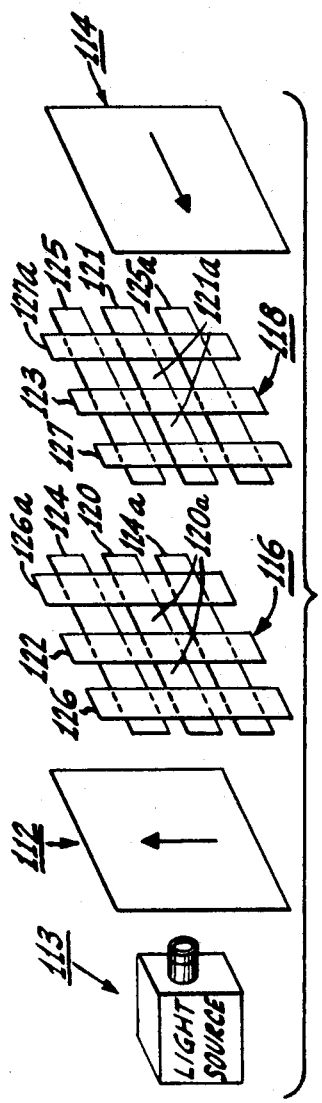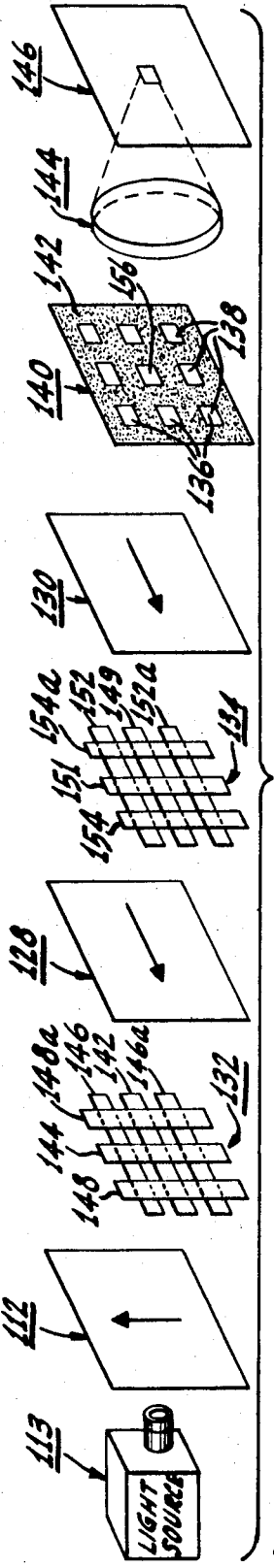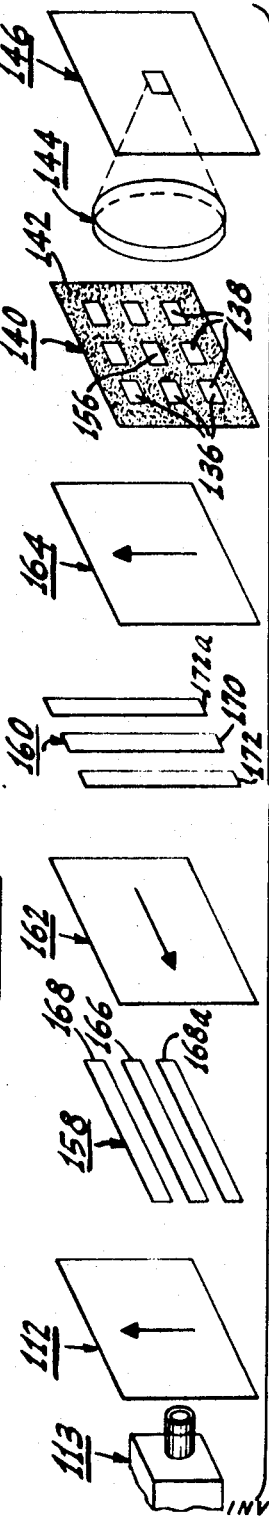

ELECTRICAL CONTROL OF LIGHT POLARIZATION UTILIZING THE OPTICAL PROPERTY OF FLUIDS

BACKGROUND OF THE INVENTION

Many proposals have been made for electronically controlling characteristics such as polarization, intensity, deflection and so on, of a light beam. For example, electro-optical crystals have been used for controlling polarization angle, but these crystals, unfortunately, have no intrinsic optical memory, and require high switching voltages. Power dissipation in the crystal and the fact that good crystals of large size are not readily available have also proven to be problems.

It is the object of this invention to provide new and improved means for electronically controlling light, which means are relatively simple, relatively inexpensive, and which operate at high speeds.

BRIEF SUMMARY OF THE INVENTION

Polarized light is projected through a container of fluid in the path of the light. The fluid is optically active and changes the polarization of the light. There are means for changing the length of the path, in the fluid, taken by the light and for changing the type of fluid for controlling the amount of change in the polarization of the light.

BRIEF DESCRIPTION OF THE DRAWINGS

FIGS. 3, 4, and 5 are partially perspective, partially schematic views of light control schemes according to the invention;

FIG. 6 is a partially perspective, partially schematic view of an optical chamber that may be utilized in the embodiment of FIG. 5;

FIG. 7 is a partially perspective, partially schematic view of a fluid matrix according to the invention; and FIGS. 8, 9, and 10 are schematic diagrams of matrix selection systems according to the invention.

DETAILED DESCRIPTION

There are many transparent organic and inorganic fluids, which may be liquids, termed optically active fluids, which can rotate the plane of polarization of a light beam either negatively or positively. For a particular fluid of a particular concentration, the amount of rotation is determined only by the length of the fluid path through which the light beam travels. Two of many liquids which are optically active are nicotine and aqueous sugar solution. The amount of rotation produced by the latter is dependent upon the sugar concentration. This invention utilizes this characteristic of optically active fluids to rotate the plane of polarization of light through some desired angle. The invention also includes means responsive to this angle of rotation to either deflect or vary the intensity of polarized light amounts dependent on the size of this angle.

Figure 1:
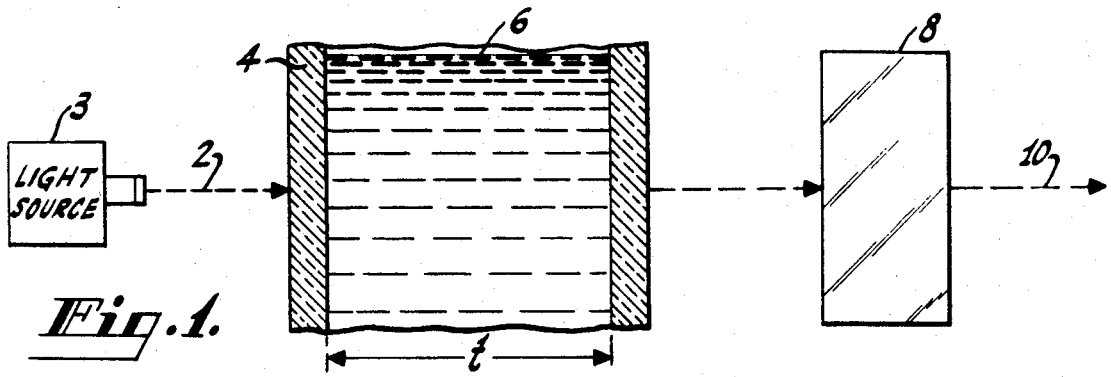
FIG. 1 is a schematic drawing to help explain the operation of the invention.

FIG. 1 illustrates the principle which is involved. A beam of plane polarized light 2 from a coherent light source 3 is projected through a transparent container 4, which contains optically active fluid 6. The light emerging from the container 4 is rotated some angle $\alpha$, whose value is a function of the length $t$ of the path in the fluid 6 through which the light is projected and the rotation constant $r$ of the optically active fluid used. In mathematical terms, $\alpha = tr$, where $\alpha$ is in degrees, $t$ is in centimeters, and $r$ is in degrees per centimeter. The polarized light at the angle $\alpha$ then passes through means 8, the details of which will be given later, for either deflecting or varying the intensity of the polarized light an amount dependent upon the angle through which the polarized light has been rotated. The light emerging from the means 8 at point 10 may be used in one of a number of different ways, as for example, for the selection of a location in an optical memory.

Figure 2:
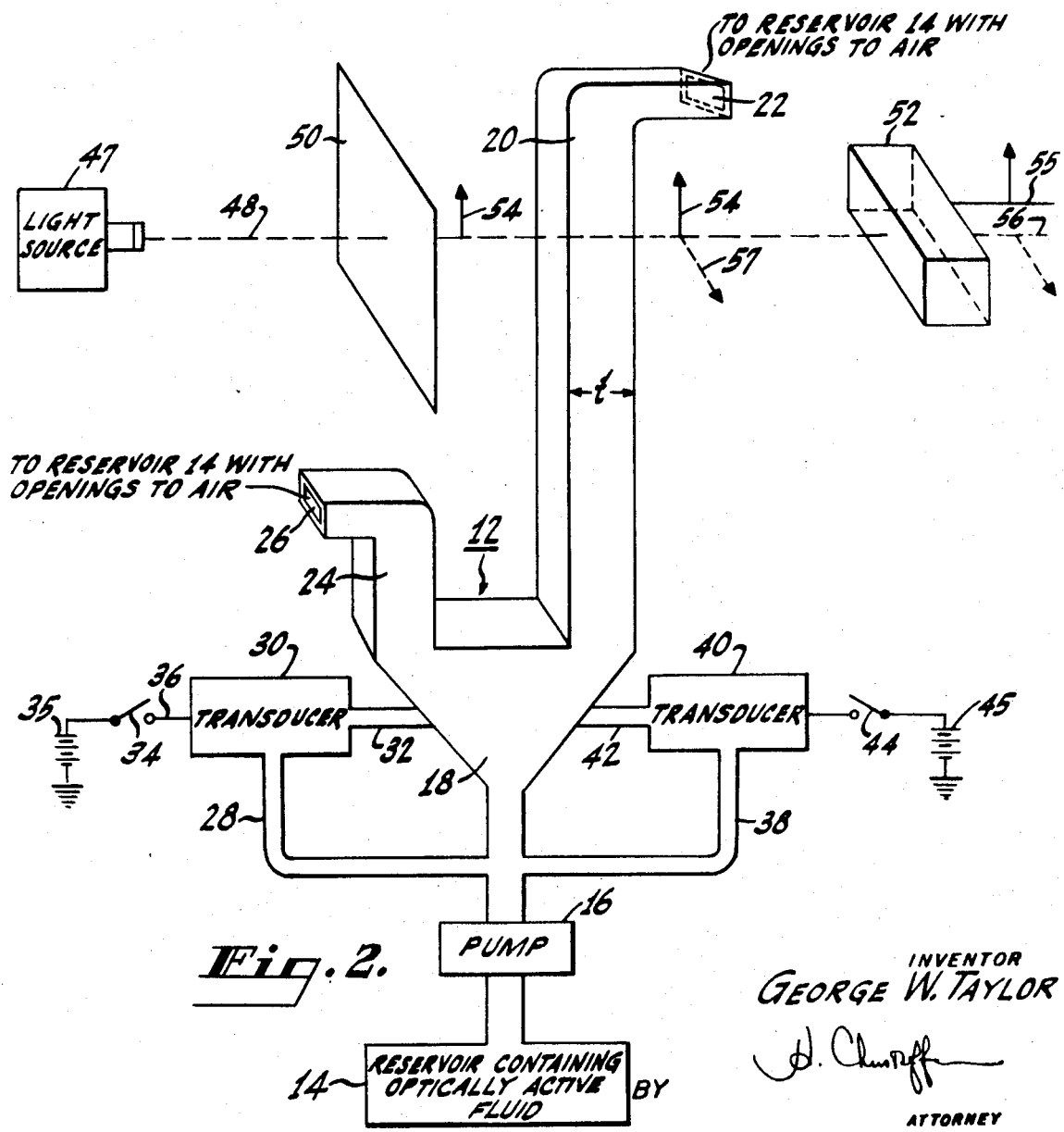
FIG. 2 is a partially perspective, partially schematic view of a fluid flip-flop according to the invention.

FIG. 2 shows one practical realization of an arrangement operating on the principle discussed above. It includes a Y-shaped container 12, which is termed a fluid logic flip-flop designed to operate in a two-phase mode, that is, contains two different fluids at one time. The flip-flop 12 includes a common reservoir of optically active fluid 14, a common pump 16 which pumps optically active fluid from the reservoir 14 into the interaction chamber 18 of the flip-flop 12 and an optical chamber 20. The latter is formed with an opening 22 which returns to the common reservoir 14 with openings to air, through a conduit (not shown). The left-hand chamber 24 also includes an opening 26 which returns to the common reservoir 14 with openings to air, via another conduit (not shown). A conduit 28 connects from the common pump 16 to a transducer 30 and a second conduit 38 connects from the common pump 16 to the transducer 40. The respective transducers connect through control ports 32 and 42 to the interaction chamber 18. The operation of the respective transducers is controlled electrically, as indicated schematically by the switches 34 and 44 which are connected to voltage sources 35 and 45, respectively. A source of coherent light 47 projects a beam of light 48 through the polarizer 50 which produces a plane polarized wave whose direction of polarization is schematically indicated by the arrow 54. The plane polarized wave is projected through the optical chamber 20 and impinges upon the uniaxial crystal 52.

The flip-flop 12 may operate in one of two states. In one state, the optical chamber 20 contains an optically active liquid which is the pumped fluid, and the left-hand chamber 24 contains an optically inactive fluid, such as air, which is the ambient fluid. This is termed the major state of the flip-flop 12. In the other state, the optical chamber 20 contains an optically inactive fluid, such as air, which is the ambient fluid, and the left-hand chamber 24 contains an optically active liquid, which is the pumped fluid. This is termed the minor state of the flip-flop 12.

If an optically inactive fluid other than air is used as the ambient fluid, it must be nonmixable with and have a different optical activity than the optically active fluid, which is the pumped fluid.

The means for controlling which state the flip-flop 12 is operating in, are the switches 34 and 44. If the flip-flop 12 is to operate in the major state, the switch 34 is momentarily closed, and a pulse of voltage, from a voltage source 35, energizes the transducer 30. The energized transducer temporarily opens a valve or other means for controlling fluid flow, situated in the transducer, which permits a pulse of fluid to pass from the conduit 28 through the transducer and through the control port 32 into the interaction chamber 18. This pulse of fluid channels the optically active fluid, which continually is being pumped into the interaction chamber 18 from the common reservoir 14, into the optical chamber 20, and air flows through the opening 26 into the chamber 24. The pumped fluid continues to flow through the optical chamber 20 after the pulse of voltage has been removed from the transducer 32 because of what is termed the Coanda effect. (The Coanda effect is a surface effect in which there is a partial vacuum on the curved surface over which the fluid flows, and the forces acting on the fluid cause the flow to adhere to the curved surface until a pulse of fluid diverts the flow from the surface.)

The flip-flop 12 may be switched to the minor state by momentarily closing the switch 44. The energized transducer 40 now permits a pulse of fluid to pass through the conduit 38 through the transducer 40 and through the control port 42 into the interaction chamber 18. This pulse of fluid diverts the flow of the optically active fluid from the optical chamber 20, into the left-hand chamber 20 into the left-hand chamber 24 and air flows through the opening 22 into the optical chamber 20. The flip-flop 12 remains in the state it is placed in by the one transducer such as 40, until the other transducer is activated. The switching time is fast—it may be of the order of 100 $\mu$sec. in response to a switching voltage of 50 volts or so.

The uniaxial crystal 52, which may be a calcite crystal or a Wollaston prism, exhibits the characteristic of deflecting light to one of two positions. If the light impinges on the crystal 52 at the angle indicated by arrow 54, the beam of light emerging from the crystal 52 is deflected to the position 55. This ray may be termed the "ordinary" ray. If the plane polarized light impinging on the crystal 52 is rotated 90°, as indicated by dashed arrow 57, the crystal 52 does not deflect the beam, and the light emerges at the position 56. The ray 56 may be termed an "extraordinary" ray.

If the flip-flop 12 is in the minor state, the beam of plane polarized light projected through the optical chamber 20, is not rotated, since the optical chamber 20 contains air, and the light is deflected to the position 55. If the flip-flop 12 is in the major state, and the length $t$ of the path through which the light is projected is chosen to be such that when there is optically active fluid present, the plane polarized light is rotated through 90°, the light projected through the optical chamber 20 emerges from the analyzer 52 at the position 56.

Summarizing the above, in one state of the flip-flop 12, the system deflects light. In another state of the flip-flop 12, the system does not deflect the light. Use is made of this property in the various embodiments of the invention which follow.

Figure 3:
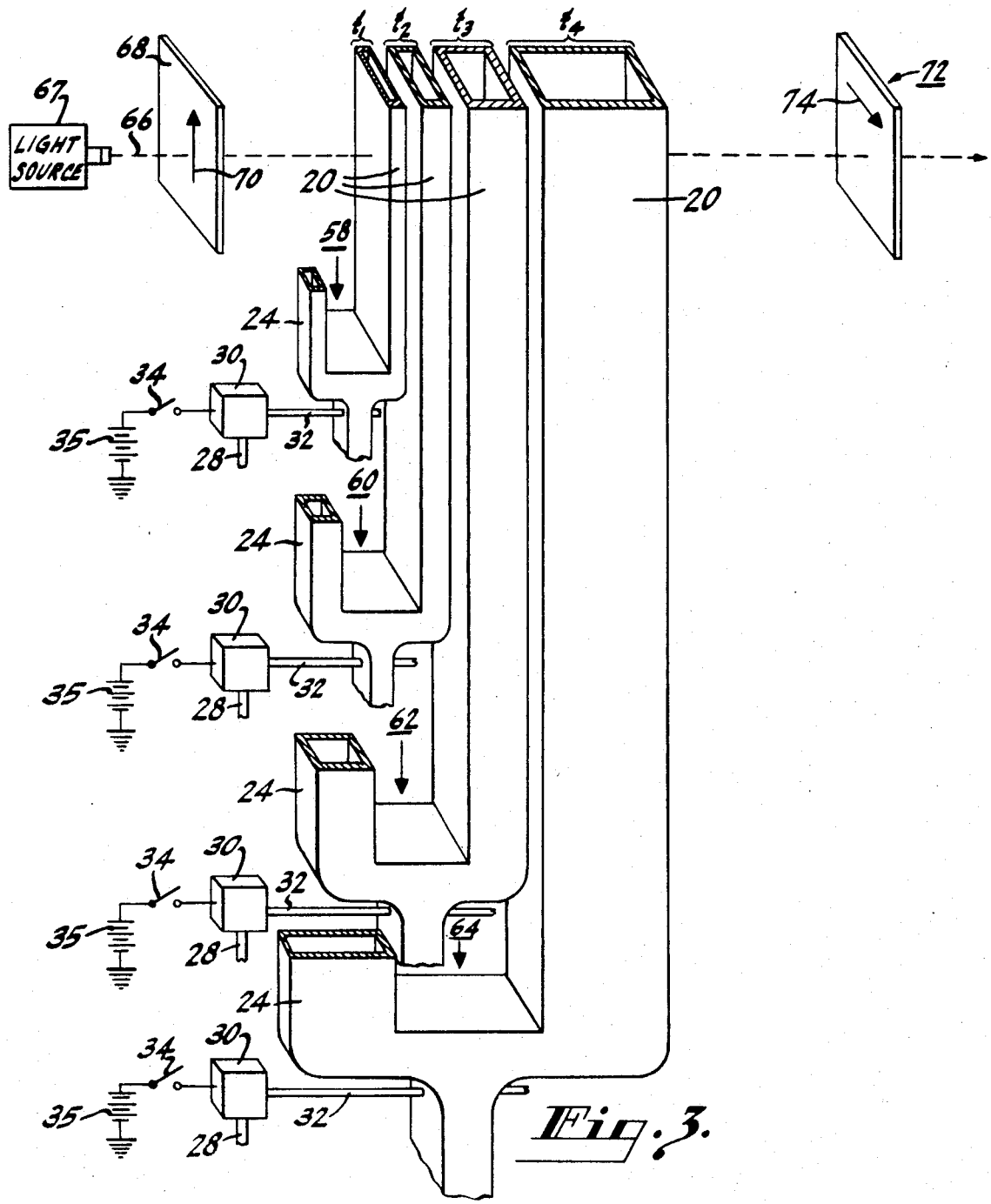

FIG. 3 illustrates a system for electrically controlling the intensity of a plane polarized light beam. Four fluid flip-flops 58, 60, 62 and 64 which operate in the manner of the flip-flop 12 described for FIG. 2 are used. Each of these flip-flops, however, has a different size optical chamber 20. The lengths $t_1$, $t_2$, $t_3$, and $t_4$ of the paths in the fluid through which the light is projected are progressively doubled so that $t_2=2t_1$, $t_3=4t_1$, and $t_4=8t_1$; For the arrangement of FIG. 3, the optically active fluid, and $t_1$ are so chosen that $t_1$ times the specific rotation constant of the fluid is equal to 6°. If, for example, quinine sulfate solution were used as the optically active liquid, $t_1$ would be equal to 0.28 centimeters. It can be seen that flip-flop 58 causes a rotation of 6°, flip-flop 60 causes a rotation of 12°, flip-flop 62 causes a rotation of 24°, and flip-flop 64 causes a rotation of 48°, when each is in its respective major state.

A beam of light 66, from a coherent light source 67 is projected through a polarizer means 68 which polarizes the light in a plane indicated by the arrow 70. This plane polarized light is projected through each of the optical chambers 20 of the four flip-flops and impinges upon an analyzer means 72. The latter has a plane of polarization 90° from that of the polarizer 68, as indicated by the arrow 74. When the polarizer 68 and analyzer 72 have planes of polarization 90° apart, they are termed cross-polarized.

The analyzer 72 varies the intensity of light projected through it dependent upon the amount of angular rotation the polarized light beam has experienced. If plane polarized light at an intensity I is projected through the analyzer 72 at a polarization angle $\theta$, the intensity $I_o$ of the light emerging, according to Malus's law, is $I_o = I \cos^2 \theta$.

The four flip-flops of FIG. 3 permit 16 different combinations of optically active fluid and air; thus it is possible to obtain 16 different light intensities from the analyzer 72. If there were $n$ flip-flops, there would be $2^n$ possible light intensities.

The total amount of angular rotation which occurs in the optical chambers of the flip-flops is the sum of the angular rotation in the individual optical chambers. Therefore, the order in which the chambers are placed, does not matter. For example, in FIG. 3, the $t_2$ chamber instead of being placed between $t_1$ and $t_3$ could equally as well have been positioned between the $t_3$ and $t$ chambers. This point is illustrated in FIG. 4.

Since there are 16 linear steps of angular rotation achieved in FIG. 3, there are 16 nonlinear steps in the intensity of the emergent light due to the $\cos^2 \theta$ characteristic of the analyzer 72. Linear steps in the intensity of the emergent light may be achieved by an arrangement as illustrated in FIG. 4. The polarizer 68 and the analyzer 72 are cross-polarized as they were in FIG. 3. The flip-flops 74, 76, 78, 80 and 82 operate in the same manner as those shown in FIGS. 2 and 3 but are shown in side view, rather than in a three-dimensional view, for ease of drawing.

The optically active fluid and the size of the optical chambers of the flip-flops are chosen so that when the individual flip-flops are in the major state, flip-flop 74 causes 6° of angular rotation, flip-flop 76 causes 8° of angular rotation, flip-flop 78 causes 40° of angular rotation, flip-flop 80 causes 24° of angular rotation, and flip-flop 82 causes 12° of angular rotation.

The flip-flops are controlled by an 11-position switch 81. For each switch position there is a different amount of total angular rotation of the polarized light in the optical chambers. The steps in the total angular rotation, from one switch position to the next, are chosen to be nonlinear, as modified by the $\cos^2 \theta$ function which permits linear steps in light intensity from the analyzer 72.

The multiple position switch 81, for one switch position or another, supplies the voltage to set certain flip-flops to the major state and others to the minor state, depending on the amount of light intensity needed for a particular situation. The voltage for setting the flip-flops to the major state is supplied on the lines 83 to the transducers 30 for each flip-flop, and the voltage for setting the flip-flops to the minor state is supplied on the lines 85 to transducers, not shown, for each flip-flop.

Table 1 gives for the 11 switch positions, the following information: which flip-flops are in the major state; the total angular rotation in the optical chambers; and the resultant intensity of the light emerging from the analyzer 72.

TABLE 1

| Switch Position | Flip-Flops in Major State | Total Angular Rotation in Optical Chambers | Resultant Intensity Emerging from Analyzer |
|---|---|---|---|
| 0 | | 0° | 0 |
| 1 | 74,82 | 18° | 0.10I |
| 2 | 74,76,82 | 26° | 0.19I |
| 3 | 76,80 | 32° | 0.28I |
| 4 | 74,76,80 | 38° | 0.38I |
| 5 | 74,78 | 46° | 0.51I |
| 6 | 82,78 | 52° | 0.62I |
| 7 | 74,82,78 | 58° | 0.72I |
| 8 | 80,78 | 64° | 0.80I |
| 9 | 76,80,78 | 72° | 0.90I |
| 10 | 74,76,78 80,82 | 90° | 1.00I |

There are 11 approximately linear steps in intensity, as shown in table 1, which are calculated by Malus's $\cos^2 \theta$ law as described for FIG. 3. The more complex the system is made, the closer one may come to an approximation of a linear scale.

A device termed a fluid logic AND gate, such as 84 in FIG. 5, may be used in a system which electrically controls the angular rotation of a plane polarized light beam. The optical chamber, in this system, is a rectangular transparent chamber 86 and the amount of rotation which takes place in the the optical chamber is the product of the specific rotation constant $r$ of the optically active fluid used and the length $t$ of the path in the fluid, taken by the light, which is the height of the fluid in the chamber 86. There is a polarizer 68 and an analyzer 72 which are cross-polarized, as were the similar elements in FIGS. 3 and 4, and a source not shown which projects light through the analyzer 68.

The AND-gate 84 has two inputs, the first being fluid, from a common reservoir, not shown, via a conduit 88, and, a second being fluid, via conduit 90. The fluid flows continuously from the reservoir through the conduit 88 through the AND-gate 84 and out the conduit 91 to the common reservoir. When, however, fluid flow is present in the conduit 90, this fluid flow diverts the fluid flow from the conduit 88 through the conduit 92 into the optical chamber 86. Fluid flow is present in the conduit 90 only when transducer 94 is energized, closing a valve, or other means for controlling fluid flow, in the transducer 94 which allows fluid to flow from a common reservoir, not shown, through the conduit 93, through the transducer 94, and into the conduit 90. The transducer 94 is controlled electrically, as indicated schematically by a switch 95 connected to a voltage source 96.

The amount of fluid flowing into the chamber 86 is a function of the time switch 95 is closed. If the switch 95 is closed in linear increments of time, it follows that there will be linear increments in the angular rotation of the polarized light beam projected through the chamber 86, and there will be nonlinear steps in the intensity of the emergent light from the analyzer 72 as calculated by Malus's $\cos^2 \theta$ law.

Linear steps of emergent light intensity from the analyzer 72 may be obtained by closing the switch 95 in nonlinear increments of time, as modified by the $\cos^2 \theta$ function.

Another scheme for achieving linear steps of emergent light intensity utilizes an optical chamber 97, as shown in FIG. 6, in place of the optical chamber 86 in FIG. 5. The shape of the chamber 97 is made proportionate to the $\cos^2 \theta$ function, so that there are linear steps of emergent light intensity when the switch 95 is closed in linear increments of time.

The fluid is removed from the chamber 86 when the transducer 98 is energized, opening a valve, or some other means for controlling fluid flow, in the transducer 98. This allows the fluid to flow, due to the force of gravity, through the conduit 100, the transducer 98, and out the conduit 101 to a common reservoir, not shown. The transducer is electrically controlled, as indicated schematically, by the switch 102 and the voltage source 104.

In the systems utilizing fluid flip-flops, pumping power is needed to retain the flip-flop in a particular state, whereas in the scheme of FIG. 5 no pumping power is needed to retain the particular state of the optical chamber 86 due to the geometry of the system. The optical chamber 86 retains the "major state" until transducer 98 is energized, and retains the "minor state" until transducer 84 is energized, as explained previously.

If a multiposition light deflection system is required, rather than the two-position light deflection system of FIG. 2, the electrically controllable polarization schemes of either FIG. 3 or FIG. 5, respectively, may be utilized. The analyzer 72 in FIG. 3 or FIG. 5, however, would be replaced by a biaxial crystal. In these cases, the light would emerge from the biaxial crystal at various points on a circular locus formed by internal conical refraction in the crystal. Each point on the locus to which the light is deflected would be determined by the total amount the plane polarized light beam was rotated in the optical chambers.

In a system as illustrated in FIG. 3 where a biaxial crystal is used in the place of the analyzer 72, there are $2^n$ finite positions to which the light may be deflected, where $n$ is the number of fluid flip-flops used. In a system as illustrated in FIG. 5, where a biaxial crystal is used in place of the analyzer 72, there are an infinite number of positions to which the light may be deflected. The number of positions are determined by the increments of time chosen in which to fill the chamber 88 with fluid. Each increment would determine a particular position to which the light beam would be deflected. For practical purposes, it has been calculated that more than 1,000 such positions are resolvable. If linear displacement of the light beam is required, rather than the circular displacement, the circular displacement may be transformed to linear displacement by means of fiber optics, such means being well known to those skilled in the art.

The fluid logic flip-flops may be used to matrix select, and open a chosen aperture from an array of many apertures. In one application of this logic function, the array of apertures are positioned in front of a corresponding array of holograms. Reading or writing into a chosen hologram is done by opening the apertures in front of the hologram, as explained below.

The fluid logic flip-flops shown in FIGS. 2 through 4 may be used to form a matrix such as the one shown in FIG. 7. The rows 108 and the columns 110 respectively are each optical chambers of fluid logic flip-flops. For the matrix shown, there are six fluid flip-flops used; one for each row and one for each column. The intersection of a row-column, such as A through J of FIG. 7, are termed "cells." A nine-cell matrix is shown for simplicity, however, as many cells as needed for a particular application may be utilized. The portions of a matrix which do not comprise a cell are covered by a light absorbing mask 109 and therefore, do not transmit light. All of the matrices in the following embodiments are constructed in this manner.

Only the optical chamber of the flip-flop is shown, for ease of drawing, but it is to be understood that the flip-flops operate in the manner of those described for FIGS. 2 through 4, and consist of the same operational parts. When the flip-flop is in the major state, there is an optically active fluid, such as a liquid in the optical chamber, and when the flip-flop is in the minor state, there is an optically inactive fluid, such as air, in the optical chamber. In the following description, the rows and columns of the matrices are described as containing or not containing an optically active fluid. It is to be understood that the flip-flops comprising these rows and columns are in the major and minor state, respectively, when such statements are made.

The angular rotation of a polarized light beam projected through a particular cell is determined by the states of the flip-flops, whose optical chambers comprise the row-column intersection forming the particular cell.

The embodiment shown in FIG. 8, which is a system for matrix selection, includes two matrices formed in the manner of the matrix in FIG. 7. There is a polarizer 112, which converts coherent light from a source 113 to plane-polarized light and an analyzer 114, which is cross-polarized with the polarizer 112. There is a matrix 116 and a matrix 118. In each matrix there is what is termed a "selected cell," the cell through which the polarized light is to be projected so a selected output means may be illuminated. The other cells in the matrix also have the polarized light projected through them, but in the preferred embodiment of the invention, this light emerges from the analyzing means at zero intensity.

The "selected cell" in matrix 116, for purposes of illustration, is chosen to be the intersection of the row 120 and the column 122, which corresponds to the cell E in FIG. 7. The row 120 and the column 122 are termed the selected row and the selected column respectively. The rows 124 and 124a are termed unselected rows, and the columns 126 and 126a are termed unselected columns.

The selected row 120 and the selected column 122 of the matrix 116, each contain an optically active fluid and the fluid and the path length are so chosen that each rotates the polarized light beam +33¾°. The unselected rows 124 and 124a and the unselected columns 126 and 126a in matrix 116, each contain an optically inactive fluid, such as air, and, therefore do not rotate the polarized light beam.

The light emerging from the "selected cell," of matrix 116 of FIG. 8 is rotated +33¾°+33¾°=+67½°. The light emerging from an "unselected cell," comprising the intersection of an unselected row 124 or 124a and an unselected column 126 or 126a, in matrix 116, does not rotate the polarized light beam. The light emerging from a "half selected cell," comprising the intersection of an unselected row 124 or 124a and a selected column 122, or a selected row 120 and an unselected column 126 or 126a of the matrix 116, is rotated +33¾°+0°=+33¾°.

The "selected cell" in matrix 118 is chosen to be the intersection of row 121 and column 123, which corresponds to the cell E in FIG. 7. This cell corresponds to the selected cell in matrix 116 to form a light path to illuminate a selected output means. The row 121 and the column 123 are termed the selected row and the selected column, respectively. The rows 125 and 125a are termed unselected rows, and the columns 127 and 127a are termed unselected columns.

In the matrix 118, the selected row 121 and the selected column 123 each contain an optically inactive fluid, such as air, and do not rotate the polarized light beam. The unselected rows 125 and 125a and the unselected columns 127 and 127a of matrix 118 each contain an optically active fluid and the fluid and the path length are so chosen that each rotates the polarized light beam −11¼°. Note that a fluid with a negative rotation constant $r$ was used in the unselected rows and columns of matrix 118. Therefore, the light emerging from an "unselected cell," which comprises the intersection of an unselected row 125 or 125a and an unselected column 127 or 127a will have its plane of polarization rotated −11¼°−11¼°=−22½°.

The light emerging from a "half selected cell," comprising the intersection of an unselected row 125 or 125a and a selected column 123, or a selected row 121 and an unselected column 127 or 127a in the matrix 118, will cause the polarized light beam to be rotated −11¼°+0°=−11¼°.

The polarized light impinging upon the analyzer 114 from the "selected cells," is rotated from the plane of polarization of the polarizer 112, +67½° (from matrix 116) +0° (from matrix 118) =+67½°. The intensity of the light from the analyzer 114 for the "selected cells" will then be 0.85I, where I is the intensity of the light emitted by the polarizer 112. This is computed from Malus's $\cos^2 \theta$ law, as already described.

The polarized light from the "half selected cells" is rotated from the plane of polarization of the polarizer 112, +33¾° (from matrix 116) −11¼° (from matrix 118) =22½°. The intensity of the light from the analyzer 114 for the "half selected cell" is then 0.14I.

The polarized light from the "unselected cells" is rotated from the plane of polarization of the polarizer 112 0° (from matrix 116) −22½° (from matrix 118) =−22½°. The intensity of the light from the analyzer 114 for the "unselected cells" is then 0.14I.

There is then a 6 to 1 intensity ratio between the light emitted from the analyzer 114 for a "selected cell" and an "unselected" or "half selected cell" for the system of FIG. 8.

If there was no light absorbing mask in the regions of the matrix other than the cells, there would be light transmitted from these sections to the analyzer 114, in the system of FIG. 8. For example, the sections 121 of row 120, of matrix 116, and sections 120a of row 121, of matrix 118, which do not comprise a cell. The polarized light from these sections are rotated from the plane of the polarizer 112 +33¾° (from row 120) and 0° (from row 121). The intensity of the light from the analyzer 114 for these sections is 0.31I, which would be difficult to distinguish from the light of the half selected or unselected cells, which is 0.14I.

In a fluid matrix, it is not possible to directly obtain an infinite or large contrast ratio between the output of a selected cell and the other cells in the matrix, as was illustrated by FIG. 8. It can be seen that even with a 6 to 1 intensity ratio, as achieved in the system of FIG. 8, there is a possibility of confusion as to which output means is selected for illumination. Such confusion does not exist if an infinite contrast ratio in intensity is obtainable.

FIG. 9 illustrates a system for achieving an infinite contrast ratio in intensity between a "selected cell" and a "half selected" or "unselected cell." There is a polarizer 112, which plane polarizes light from a coherent light source 113, such as a laser, and an analyzer 128, cross-polarized with the polarizer 112. There is a second analyzer 130, also cross-polarized with the polarizer 112. There are two fluid logic matrices 132 and 134 and an array of three rows 136 and three columns 138 of holograms 140, within a light absorbing mask 142. Each hologram is situated in the light path from a matrix cell. There is a lens means 144 and an output means 146.

In the matrix 132, a selected row 142 and a selected column 144 each contain an optically active fluid and the fluid and the path length are so chosen that each rotates the angle of polarization of the light beam +45°. The unselected rows 146 and 146a and the unselected columns 148 and 148a each contain air and do not rotate the polarized light beam.

The light transmitted by the "selected cell," which comprises the intersection of row 142 and column 144, is rotated +90° and emerges from the analyzer 128 at intensity I in the plane of polarization of analyzer 128. The light transmitted by the "half selected cells," which comprise the intersection of row 142 and columns 148 or 148a or column 144 and rows 146 or 146a is rotated +45° and emerges from the analyzer 128 at an intensity 0.5I in the plane of polarization of the analyzer 128. The light transmitted by the "cells," which comprise the intersection of rows 146 or 146a and columns 148 or 148a, is not rotated and, therefore, no light emerges from the analyzer 128.

In the matrix 134, a selected row 148 and a selected column 150 each contain an optically active fluid and the fluid and the path length are so chosen that each rotates the angle of polarization of the light beam +90°. The unselected rows 152 and 152a and the unselected columns 154 and 154a each contain air and do not rotate the polarized light beam.

The "selected cell," in matrix 134, which comprises the intersection of row 149 and column 151 has plane polarized light at intensity I in the plane of polarization of analyzer 128 impinging on it. This light is rotated +180°, which is optically indistinguishable from 0°, and emerges from the analyzer 130 at an intensity I in the plane of polarization of analyzer 130. This light illuminates the selected hologram 156 and is focused by lens means 144 on the output means 146.

The "half selected cells" in matrix 134 which comprise the intersection of row 149 and columns 154 or 154a or column 151 and rows 152 or 152a have plane polarized light in the plane of polarization of analyzer 128 at intensity one-half I impinging on them. This light is rotated +90° and, therefore, no light emerges from the analyzer 130, and the holograms situated in the light paths of the "half selected cells" are not illuminated.

The "unselected cells," in matrix 134 which comprise the intersection of rows 152 or 152a and columns 154 or 154a have no light impinging upon them from the analyzer 128, therefore there is no light projected by the analyzer 130, and the holograms situated in the paths of the unselected cells are not illuminated.

An infinite contrast ratio in intensity is achieved by the system of FIG. 9, and therefore, only the selected hologram 156 in the array of holograms 140 is illuminated.

The preferred embodiment for achieving an infinite contrast ratio in intensity is illustrated in FIG. 10. There is only one matrix utilized, and the rows 158 and the columns 160 have an analyzer 162, which is cross-polarized with the polarizer 112, placed between them. A second analyzer 164 is cross-polarized with the first analyzer 114. There is an array of holograms 140, a lens means 144, and an output means 146 which are identical to the ones described for FIG. 9.

The selected row 166 contains an optically active fluid and rotates the polarized light beam +90°, whereas the unselected rows 168 and 168a contain air and do not alter the angle of polarization. The selected column 170 contains an optically active fluid and rotates the polarized light beam +90°, whereas the unselected columns 172 and 172a contain air and do not alter the angle of polarization.

When light from a coherent light source 113 is projected through the polarizer 112 the unselected rows 168 and 168a do not change the angle of polarization, and the analyzer 162 does not pass this light, since it is cross-polarized with the polarizer 112. The selected row 166, however, causes the plane polarized light projected through it to be rotated +90° and, therefore, emerges from the analyzer 162 with an intensity I in the plane of polarization of the analyzer 162. This beam of plane polarized light from row 166 impinges upon the columns 160, and the unselected columns 172 and 172a do not change the angle of polarization 50 the analyzer 164 does not pass this light, since it is cross-polarized with analyzer 162. The selected column 170 however, rotates the light projected through it +90°, and this light which has been projected through the path comprising the intersection of row 166 and column 170 emerges from the analyzer 164 at an intensity I, and the selected hologram 156 is illuminated. The light projected through the hologram 156 is then focused by the lens means 144 on an output means 146.

What is claimed is:

1. In combination:
    a source of plane polarized light;
    a single transparent container in the path of the light;
    at least two different optically active fluids, each such fluid, when in said container, rotating the plane of polarization of the plane polarized light through a different angle; and
    means for individually adding and removing said fluids from said container.

2. In combination:
    a source of polarized light;
    a two-state device having a single optical chamber in the path of the light which in one state said optical chamber contains fluid of the type which changes the polarization of the light, and which in the other state contains fluid of the type which does not affect the polarization of the light;
    means for controlling the state of said device; and
    means responsive to the amount of change in said polarization for varying the intensity of the light.

3. The combination claimed in claim 2, said fluid of the type which changes the polarization of light comprising a liquid.

4. In combination:
    a source of polarized light;
    a two-state device having a single optical chamber in the path of the light;
    means for placing said device in one state comprising means for filling said chamber with a fluid of the type which changes the polarization of the light, and for placing said device in its other state comprising means for filling said chamber with a fluid of the type which does not affect the polarization of the light; and
    means responsive to the amount of change in said polarization for deflecting the light.

5. In combination:
    a fluid which changes the plane of polarization of light;
    means for directing a plane polarized beam of light through said fluid;
    means for changing the length of the path in said fluid taken by said light;
    an element responsive solely to each different path length through said fluid taken by said light for correspondingly affecting, to an extent which is a given function of path length, a characteristic of said light; and
    an element which includes deflection means stationary relative to said plane polarized light beam responsive to each different path length through said fluid taken by said light for affecting the deflection of light solely as a function of path length.

6. In combination:
    a fluid which changes the plane of polarization of light;
    means for directing a plane polarized beam of light through said fluid;
    means for changing the length of the path in said fluid taken by said light in $n$ linear increments, where $n$ is an integer greater than 2; and
    an element responsive solely to each different path length through said fluid taken by said light for correspondingly affecting, to an extent which is a given function of path length, a characteristic of said light.

7. In combination:
    a fluid which changes the plane of polarization of light;
    means for directing a plane polarized beam of light through said fluid;
    means for changing the length of the path in said fluid taken by said light comprising means for varying said length in $n$ linear increments in a geometric progression, where $n$ is an integer greater than unity; and
    an element responsive solely to each different path length through said fluid taken by said light for correspondingly affecting, to an extent which is a given function of path length, a characteristic of said light.

8. A method of modulating the intensity of plane polarized light comprising the steps of:
    directing the light through a fluid of the type which changes the plane of polarization of said light;
    selectively incrementally changing the length of the path through the fluid taken by the light; and
    correspondingly for each path length changing the intensity of the light emerging from the fluid solely as a function of path length.

* * * * *